Figure 1:
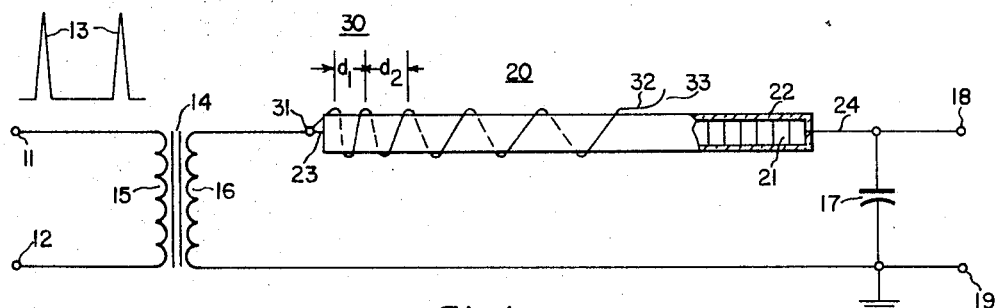

Oct. 11, 1966  A. H. B. WALKER  3,278,826
RECTIFIER ASSEMBLY
Filed March 19, 1963

WITNESSES
Theodore F. Wrobel
Leoy M. Gannon

INVENTOR
Alec H.B. Walker
BY J.W. Cleary
ATTORNEY

United States Patent Office 3,278,826
Patented Oct. 11, 1966

3,278,826
RECTIFIER ASSEMBLY
Alec H. B. Walker, Trafford, Pa., assignor to Westinghouse Electric Corporation, Pittsburgh, Pa., a corporation of Pennsylvania
Filed Mar. 19, 1963, Ser. No. 266,387
3 Claims. (Cl. 321—8)

This invention relates to a rectifier assembly and more particularly to a solid state rectifier.

Compared to thermionic rectifiers, the amount of high voltage and high frequency components that a solid state rectifier can handle is relatively small. When high frequencies at high voltage levels are applied to these rectifiers, the solid state rectifier will heat up near one end of the rectifier and either fail or cause unnecessary losses in the circuit. As a specific example, the television high voltage supplies are obtained by rectifying a high voltage flyback pulse obtained from the horizontal deflection circuit which pulses occur at the horizontal frequency of 15,750 cycles per second having rise and fall times corresponding to frequencies in the order of 100,000 cycles per second. In addition, the effective voltage of these pulses is in the order of 20,000 volts. Such pulses can be easily handled by thermionic rectifiers but the above difficulties arise when solid state rectifiers such as selenium rectifiers are employed.

The frequency and voltage limitation of solid state high voltage rectifiers is caused in part by the stray capacitance of the rectifier to ground which is distributed along the length of the rectifier. In the conventional solid state series connected stacked disc rectifier, this stray capacitance results in the high frequency components of, for example, the above described TV pulse, having a low impedance path to ground, through the stray capacitance near a first end of the rectifier connected to the high voltage and diminishing towards the other end of the rectifier. As a result of this, the first end of the rectifier carries most of the stray alternating current which is passed to ground whereas the other half of the rectifier carries very little stray alternating current components. This causes unequal heating distribution throughout the rectifier and overheating at the first end of the rectifier and eventual failure of the rectifier.

Accordingly, an object of the invention is to provide a new and improved solid state rectifier assembly.

A further object of the invention is the provision of a solid state rectifier assembly which can handle relatively high frequency components with the relatively uniform distribution of current and heat throughout the rectifier.

Still another object of the invention is to provide a rectifier which can handle relatively high voltages with relatively high frequency components without the rectifier failing.

According to the present invention there is provided a rectifier having distributed stray capacitance. A conducting member is disposed longitudinally of this rectifier and is capacitively coupled to the rectifier which capacitive coupling reduces from the one end of the rectifier to the other end of the rectifier so as to provide a capacitive path for stray high voltage, high frequency currents which would otherwise flow through the rectifier. This conducting member, diverting these stray high frequency currents from passage through the rectifier results in a relative equal distribution of stray current through the rectifier and thereby a relative even distribution of heat through the rectifier.

Figure 2:
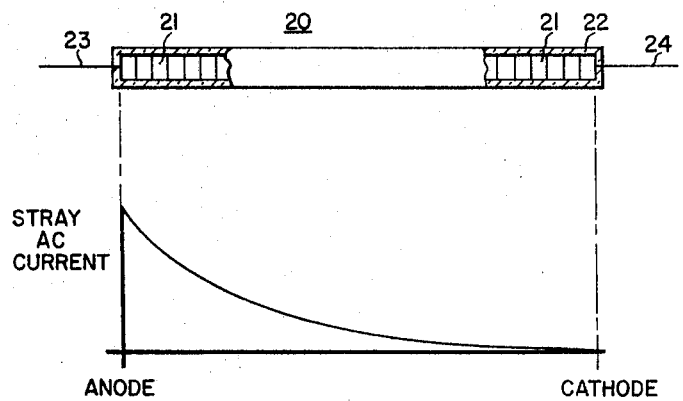

Other features and objects of my invention will best be understood by reference to the following description, taken in conjunction with the attached drawing, in which:

FIGURE 1 is a schematic diagram of a solid state rectifier embodying the invention; and FIG. 2 is a graph useful in explaining the invention.

FIG. 1 illustrates a rectifier circuit utilizing a rectifier assembly embodying the invention. The circuit illustrated in FIG. 1 comprises input terminals 11 and 12 to which a voltage pulse is applied such as high voltage flyback pulse 13 obtained from a horizontal deflection circuit of a television receiver. The two terminals 11 and 12 are connected to the primary 15 of a transformer 14 having a secondary 16. Connected in series with the secondary 16 is a solid state rectifier 20, and a filter capacitor 17. Output terminals 18 and 19 are connected across the filter capacitor to provide an output from the rectifier circuit. The output terminal 19 is connected to ground as illustrated.

The rectifier 20 is of the type having a plurality of rectifier elements 21 such as selenium discs, which are stacked so as to be connected in series. It will be understood that the invention herein applies to any rectifier which has distributed stray capacitance. Such stray capacitances are a prominent characteristic of rectifiers which are made up of a plurality of rectifier elements. The rectifier elements are conventionally provided in a series connected stack as shown in FIG. 1 and aligned and housed in a cylindrical insulating housing 22. This insulating housing can be made of some suitable insulator such as glass. The rectifier shown in FIG. 1 is poled so that the left-hand side is the anode side having terminal 23 electrically connected to the anode side of the rectifier stack whereas terminal 24 is electrically connected to the cathode side of the rectifier stack. Some suitable means such as a spring can be utilized in housing 22 to provide good contact between discs 21.

The rectifier as illustrated in FIG. 2 is of the conventional configuration described above. In such a rectifier, the anode terminal 23 of the rectifier receives the high voltage, high frequency component voltage pulses. Due to the distributed capacitance along the length of the rectifier stack, the high frequency, high voltage AC components are capacitively coupled to ground through this stray capacitance and particularly at the anode end. As a result in conventional type rectifier stack described above, most of the stray alternating current is passed through the end defined by the left portion of the stack or near the anode section. This is illustrated in the graph in FIG. 2 which plots stray alternating current vs. the length of the rectifier. This relatively high stray alternating current occurring near the anode end of the rectifier results in extremely high heat at the anode end and relatively early breakdown of the rectifier in this portion of the rectifier stack.

The rectifier assembly embodying the invention is illustrated in FIG. 1, and employs a wire electrical conductor 30 having one end 31 connected to the anode terminal 23 of the rectifier near the anode end of the rectifier stack. This conductor, shown in the form of a length of conducting wire, is spirally wound about and on the rectifier housing 22 with the pitch increasing toward the cathode end of the rectifier. Since the pitch of the winding of conductor 30 increases the distances $d_1$ and $d_2$ etc. progressively increase between each wind of wire. Due to this increasing pitch of the winding of wire 30, the capacitive coupling between the wire 30 and the rectifier elements 21, decreases from the anode end of the rectifier stack to the cathode end. As a result the alternating current coupling between the rectifier elements 21 and the conductor 30 decreases towards the cathode end. As a result the high frequency, high voltage alternating current components, which would ordinarily pass through rectifier elements particularly near the anode end, are capacitively coupled at the anode end to the conductor 30 and thence to ground rather than passing through more rectifier elements 21.

It has been discovered that the conductor 30, as described above greatly reduces the heating and breakdown of the rectifier 20. The exact method of winding the wire to have decreasing capacitive coupling can be optimized for the size and type of rectifier 20 being used.

The other end of the conductor 30 illustrated in FIG. 1 has a portion 32 disposed along housing 22 parallel to the axis of the rectifier and then a continuing portion 33 turned away from the rectifier. It has been discovered that such a termination (portion 33) of wire 30 prevents detrimental corona effects at the end of conductor 30.

While I have indicated and described an embodiment of my invention it will be apparent to one skilled in the art that my invention is by no means limited to the particular embodiment illustrated and modifications may easily be made without departing from the scope and spirit of the invention.

I claim as my invention:

1. A rectifier assembly comprising a plurality of rectifier elements assembled in series to form a single rectifier unit, a first terminal connected to one end of said rectifier and a second terminal connected to the other end of said rectifier, a conducting member having one end connected to said one end and disposed about said unit in a coil to provide decreasing capacitive coupling to said elements in a direction from said first terminal toward said second terminal.

2. A rectifier assembly comprising a plurality of rectifier elements assembled to form a stack that comprises a single rectifier unit having an anode at one end of said stack and a cathode at another end of said stack, a first terminal connected to the anode end of said stack and a second terminal connected to the cathode end of said stack, and a conducting member connected to said first terminal and disposed about said stack in a coil to provide decreasing capacitive coupling with said elements in a direction toward said second terminal.

3. A rectifier assembly comprising a plurality of rectifier elements assembled to form a stack that comprises a single rectifier unit, a first terminal connected to one side of said stack and a second terminal connected to the other side of said stack, and a length of wire having one end connected to said first terminal and disposed about at least a portion of said stack in a coil, the pitch of which increases toward said second terminal.

References Cited by the Examiner

UNITED STATES PATENTS

| | | | |
|---|---|---|---|
| 3,123,760 | 3/1964 | Wouk et al. | 321—11 |
| 3,128,421 | 4/1964 | Skellett | 321—11 |

JOHN F. COUCH, *Primary Examiner.*

LLOYD McCOLLUM, *Examiner.*

W. H. BEHA, *Assistant Examiner.*

Notice of Adverse Decision in Interference

In Interference No. 96,046 involving Patent No. 3,278,826, A. H. B. Walker, RECTIFIER ASSEMBLY, final judgment adverse to the patentee was rendered July 11, 1968, as to claims 1, 2 and 3.

[*Official Gazette September 24, 1968.*]